(12) United States Patent
Johnson et al.

(10) Patent No.: US 10,225,994 B1
(45) Date of Patent: *Mar. 12, 2019

(54) AGRICULTURAL APPARATUS AND METHOD

(71) Applicants: Gary Lind Johnson, Ocoee, FL (US); Kirk David Johnson, Winter Park, FL (US)

(72) Inventors: Gary Lind Johnson, Ocoee, FL (US); Kirk David Johnson, Winter Park, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/164,865

(22) Filed: Oct. 19, 2018

Related U.S. Application Data

(62) Division of application No. 15/893,947, filed on Feb. 12, 2018, now Pat. No. 10,136,587.

(Continued)

(51) Int. Cl.
*A01G 9/02* (2018.01)
*A01G 9/08* (2006.01)
(Continued)

(52) U.S. Cl.
CPC ............. *A01G 9/088* (2013.01); *A01G 7/02* (2013.01); *A01G 7/045* (2013.01); *A01G 9/022* (2013.01); *A01G 9/143* (2013.01); *A01G 9/18* (2013.01); *A01G 9/20* (2013.01); *A01G 9/247* (2013.01); *A01G 25/09* (2013.01); *A01G 25/165* (2013.01); *A01G 27/003* (2013.01); *A01G 27/005* (2013.01); *A01G 27/008* (2013.01); *B65G 9/002* (2013.01); *B65G 35/06* (2013.01); *B65G 43/08* (2013.01); *B65G 2201/0202* (2013.01);
(Continued)

(58) Field of Classification Search
CPC ........ A01G 9/022; A01G 9/023; A01G 9/024; A01G 9/088; A01G 9/247; A01G 25/09
USPC ........ 47/39, 44–47, 48.5, 62 R–63, 65, 65.5, 47/66.6, 79, 82
See application file for complete search history.

(56) References Cited

U.S. PATENT DOCUMENTS 3,771,258 A 11/1973 Charney
4,028,847 A 6/1977 Davis et al.
(Continued)

FOREIGN PATENT DOCUMENTS

EP 0012011 A1 * 6/1980 ............. A01G 9/023
EP 0610137 B1 12/1997

*Primary Examiner* — David J Parsley
*Assistant Examiner* — Danielle A Clerkley
(74) *Attorney, Agent, or Firm* — John V. Stewart

(57) ABSTRACT

A conveyor system (4, 5) moves vertical poles (2) in an agricultural facility between a growing area (20) and a workstation (W). Each pole carries plant growing containers (3) at multiple levels (H1-H9). An irrigation reservoir (30) may be mounted on each pole. Irrigation lines (31-33) from the reservoir may be individually metered (35) at each level to compensate for differing water pressure with height. Sensors (40) in the reservoir and at each level of the poles may provide a controller (36) with data input. The controller may impose different growing conditions in different areas of the facility, including vertically different grow areas (20A, 20B), and controls pole movements and locations selectively to provide a sequence of poles at the workstation ready to harvest on a demand schedule. The workstation may have multiple heights (W1, W2, W3) for tall poles that increase plant density per facility footprint.

14 Claims, 5 Drawing Sheets

Related U.S. Application Data

(60) Provisional application No. 62/571,437, filed on Oct. 12, 2017.

(51) Int. Cl.
*A01G 25/16* (2006.01)
*B65G 43/08* (2006.01)
*B65G 35/06* (2006.01)
*B65G 9/00* (2006.01)
*A01G 25/09* (2006.01)
*A01G 27/00* (2006.01)
*A01G 9/24* (2006.01)
*A01G 7/04* (2006.01)
*A01G 9/20* (2006.01)
*A01G 7/02* (2006.01)
*A01G 9/18* (2006.01)
*A01G 9/14* (2006.01)

(52) U.S. Cl.
CPC ........... *B65G 2203/0208* (2013.01); *B65G 2203/0283* (2013.01); *B65G 2203/042* (2013.01); *B65G 2812/182* (2013.01)

(56) References Cited

U.S. PATENT DOCUMENTS

| | | |
|---|---|---|
| 4,055,991 A * | 11/1977 | Bridwell ............... G01F 23/66 |
| | | 47/59 R |
| 4,068,405 A | 1/1978 | Campbell et al. |
| 4,419,843 A | 12/1983 | Johnson, Sr. |
| 4,723,665 A | 2/1988 | Benedict et al. |
| 5,598,662 A | 2/1997 | Droste |
| 6,840,008 B1 | 1/2005 | Bullock et al. |
| 8,549,779 B2 | 10/2013 | Ceurvels |
| 8,756,860 B1 | 6/2014 | Murphy |
| 2010/0146854 A1 | 6/2010 | Cannon et al. |
| 2011/0120002 A1 | 5/2011 | Pettibone |
| 2012/0085721 A1 | 4/2012 | Michael et al. |
| 2013/0145690 A1 | 6/2013 | Cannon |
| 2014/0165468 A1* | 6/2014 | Roeser ............... A01G 9/12 |
| | | 47/62 R |
| 2015/0223418 A1 | 8/2015 | Collins et al. |
| 2017/0055460 A1 | 3/2017 | Brusatore |

* cited by examiner

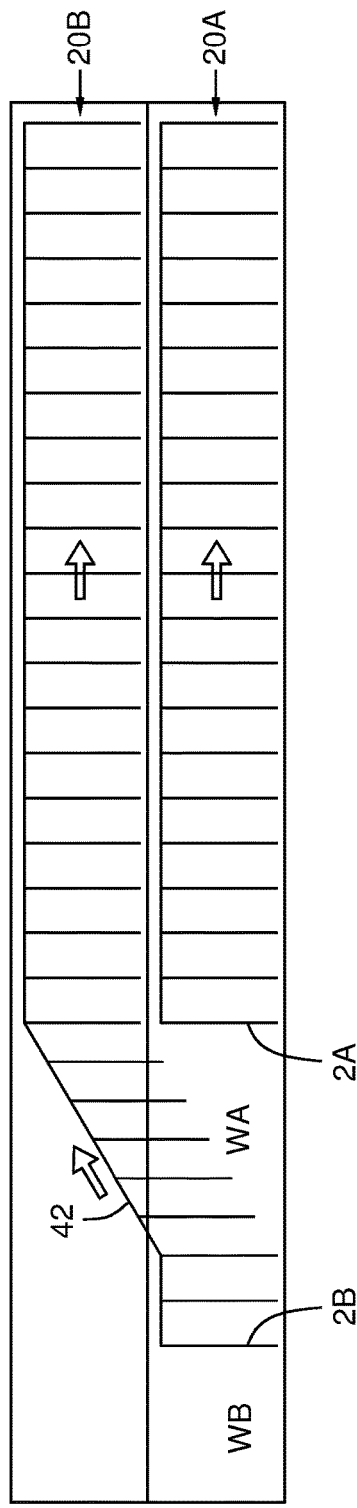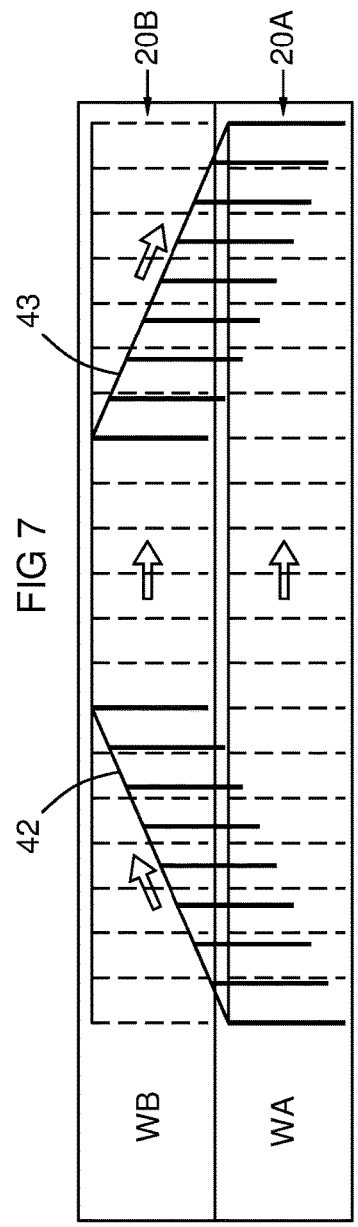

AGRICULTURAL APPARATUS AND METHOD

CROSS-REFERENCE TO RELATED APPLICATIONS

This application is a division of U.S. patent application Ser. No. 15/893,947, filed Feb. 2, 2018, which claims benefit of U.S. provisional patent application 62/571,437 filed Oct. 12, 2017. These two patent applications are incorporated by reference herein.

FIELD OF THE INVENTION

This invention relates generally to the field of agriculture, and in certain embodiments to a process and system for control and management of vertical poles that hold agricultural plants in containers attached to the poles, and which move on a conveyance between a grow area and a workstation for tending.

BACKGROUND OF THE INVENTION

Demand for increased food production necessitates innovative approaches to traditional farming models. There are vertical growing systems utilizing hydroponics, aquaponics, or soil to produce vegetables. Growing indoors with grow lights controls the growing environment and protects the plants from insects and diseases, eliminates weather variances, and reduces potential for worker accidents. Growing plants on fixed trays or poles require workers to travel to the plants for planting, maintenance, and harvesting, which is labor and equipment intensive. Improvements in efficiency and productivity are provided by the present invention.

SUMMARY OF THE INVENTION

Certain embodiments of this invention incorporate a conveyor system such as an overhead monorail or I-beam rail system to move and manage vertical poles holding pots or bags of agricultural plants in a greenhouse or building, stationed in a grow area with natural or artificial light. Through the use of the conveyance, the indoor farm can manage individual poles or groups of poles similarly to how railroad yards shuttle and organize rail cars utilizing switching mechanisms. This reduces the need for expensive and dangerous vehicles such as tractors and harvesters. Furthermore, the conveyance may rotate some poles above other poles in a multilevel growing arrangement that increases production per square foot.

An object of the invention is apparatus and operation for plant growing poles suspended from overhead rails or monorails and moved manually or via a motor or engine mechanism to a workstation where the poles are maintained and the plants are tended and harvested then moved back to the growing area. The invention may use computer programs, plant sensors, water sensors, or any electronic devices for identification and data collection from the poles and/or plants, and may use automation to move poles and plants to and from the workstation.

Moving the plants to the worker allows the farm to utilize workers with disabilities to become contributing employees because they can stay in a fixed spot in a supervised worker-friendly area while the poles are rotated to them for maintenance and harvesting. Workplace accidents can be reduced compared to field activities.

A further object of the invention is to provide a process, method, and system for improved inventory control and maintenance of the poles and the plants grown on them in a controlled environment. It is also an object of the invention to provide a process, method and system for computer control of each pole and each plant whereby a specific pole and the data related to that pole can be identified and, if needed, a pole/plant moved to a specific area of a workstation for maintenance or harvesting. Another object of the invention is to provide a commercially practicable process for gathering growth data on each plant, because each plant can now be identified and controlled, and using that data, the growth and yields of each plant can be efficiently optimized. A further object of the invention is to be able to locate growing facilities in close proximity to consumption in order to minimize transportation costs and environmental impacts of trucking emissions and food spoilage in transit. A further object of the invention is to be able to provide "just-in-time" scheduled deliveries of fresh, local, safe, organic produce products on a weekly, year around basis which allows the food costs for the buyers to be stabilized and not subject to seasonal or environmental impacts.

BRIEF DESCRIPTION OF THE DRAWINGS

The invention is explained in the following description in view of the drawings that show:

FIG. 6 is a side schematic view of a facility with two vertically stacked grow areas served by one or two work stations on one floor.

FIG. 7 is a side schematic view of a facility with two vertically stacked grow areas with selective movement of poles between the two areas.

DETAILED DESCRIPTION OF THE INVENTION

Figure 1:
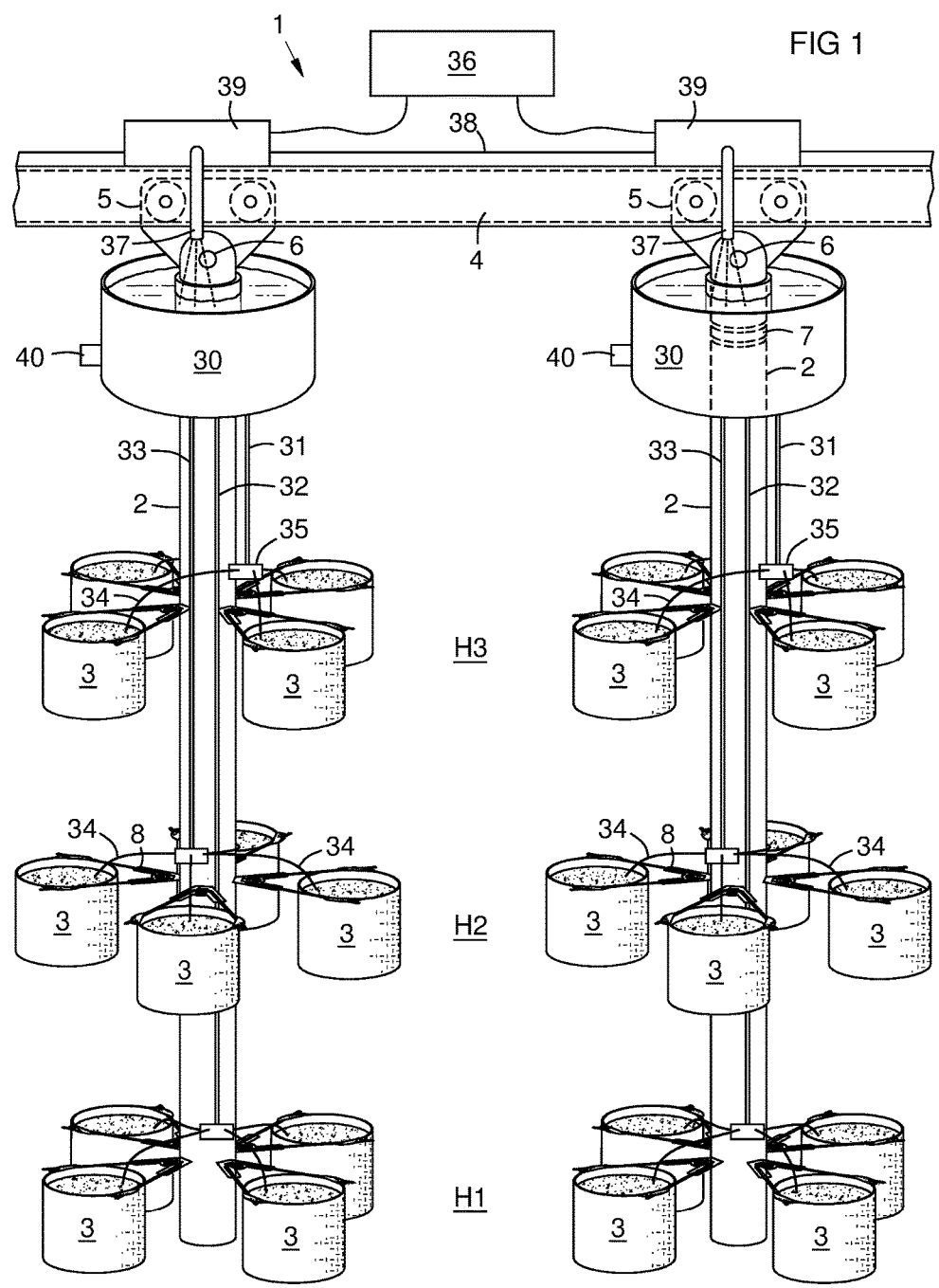
FIG. 1 is a perspective view of vertical poles with plant growing containers suspended from an overhead rail via a movable trolley.

FIG. 1 illustrates an agricultural apparatus 1 with vertical poles 2 holding plant growing containers 3 at three heights H1, H2, H3 from the pole bottom. An overhead rail 4 provides a conveyor system. Suitable overhead rail types include I-beams, open slotted rails, enclosed rails, inverted rails and hybrid combinations of these or other variations. Each pole is attached to the rail via a trolley 5 that moves along the rail. The trolley may have rollers or slides that move along the rails utilizing a lubricant or magnetic levitation. One type of overhead conveyor system uses a generally rectangular tubular rail with a trolley inside the rail and a load coupler extending downward from the trolley through a slot in the bottom of the rail. Each vertical pole 2 may be attached to a load coupler by a pivot pin 6 that allows the pole to remain vertical regardless of any incline in the rail. Other pole attachment options include a hook or eye attached to the pole and a hook or eye attached to the trolley, or the poles can be suspended or attached to the trolley by chain, wire, rope, fabric string, tape or other connecting mediums. A pole-turning bearing 7 may be provided to allow turning the pole about its axis by a worker to access all sides of it. Each plant growing container 3 may be attached to the pole by a bracket 8 as later described. Exemplary plant growing containers are fiber bags with bag suspension loops on opposite sides of the top opening of each bag. The containers 3 hold soil or other growing medium.

An irrigation reservoir 30 may be attached to the top end of each pole 2 or to a load bar connected between two trolleys. It may provide time-release gravity-feed irrigation to multiple heights H1, H2, H3 on the pole via irrigation lines 31, 32, 33 comprising outlets 34 with differential metering 35 per height that compensates for different water pressures at the different heights on the pole. An irrigation distributor 35 may be provided at each height. It may provide metering controlled automatically by a control system 36 based on input from a sensor at each height, which may include a sensor in at least one container 3 at each height that measures soil moisture. The irrigation reservoir may be refilled as needed by one or more outlets 37 of irrigation supply lines 38 via valves 39 controlled by a control system. The control system may move a given pole to a refill outlet based on input from a water gauge 40 on the reservoir. The reservoir 30 may be removable for cleaning. For example it may be U-shaped in a top view to slide horizontally around the pole, supported by a shelf or flange on the pole.

One reservoir 30 may be provided per pole mounted at the top of the pole with an irrigation line feeding a distributor 35 at each level H1-H3. Alternately, one reservoir may be provided per level, feeding a respective distributor 35, which may be an electronic drip rate monitor and controller for outlets 34 directed to multiple plant growing containers 3 at the respective level. Multiple reservoirs may be mounted at the top of the pole or one reservoir may be mounted at each respective level. Alternately, one reservoir may be provided per plant, mounted anywhere on the pole above the plant, for example multiple reservoirs may be mounted at each respective level. When reservoirs are mounted at each respective level of the plant growing containers, the gravitational irrigation pressure is equalized for each level. The irrigation line from each reservoir may have a manual valve or an electronic drip rate monitor and controller as known in hospitals. In one embodiment the reservoirs are bladders. Alternately, irrigation may be sprayed onto the plants and containers from stationary nozzles beside the poles, with runoff recycled by a sump pump.

A computer program in the control system may control and track the pole locations, plant species growing on each pole, a history of watering, fertilizing, and trimming, etc. of each plant, and growth stages of individual plants or groups of plants relative to the harvest cycle. Identification of individual poles and plants may be accomplished with a bar code, serial number, or other human or machine readable indicator to facilitate automated database updating. Optionally, each pole, plant, or subset of plants on a pole may have one or more electronic sensors, that sense parameters such as soil chemistry, gasses near the leaves, and/or leaf color, and communicate this data to the controller wirelessly. Electronics on the poles may be powered by batteries, which may optionally be recharged by induction from a primary coil in the rail to a secondary coil in the trolley, or by photovoltaic cells on the poles, or by slidable electrical contacts in the rails and trolleys. The sensors may communicate with the controller wirelessly or via the slidable contacts.

Figure 2:
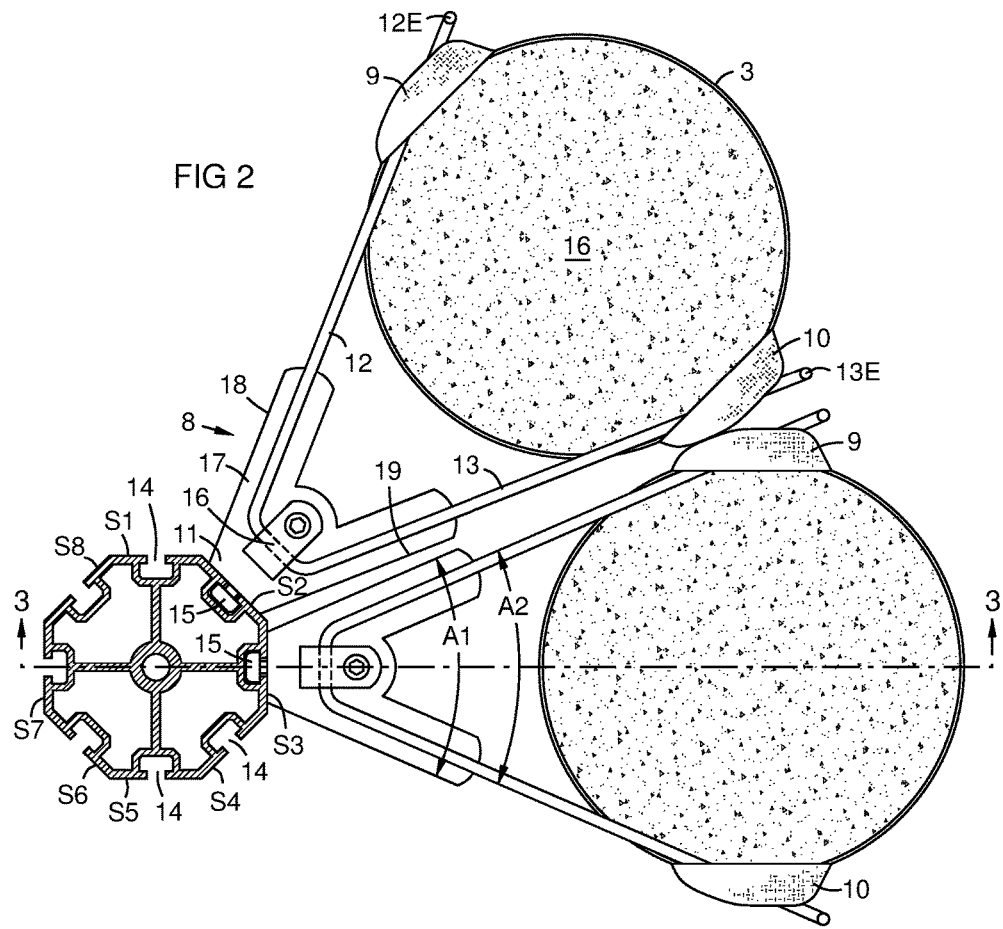
FIG. 2 is a top view of a vertical pole with brackets holding plant growing containers.

FIG. 2 is a top view of a vertical pole 2 with brackets 8 holding plant growing containers 3 via suspension loops 9, 10 on opposite sides of the top opening of each container. Each bracket may comprise a root portion 11 affixed to a side of the pole, and first and second arms 12, 13 that diverge from each other starting from the root portion and extending to respective first and second distal ends 12E, 13E for holding the suspension loops 9, 10. Each distal end may have a retention device such as a hook.

The pole 2 may have multiple substantially flat side walls S1-S8 along at least part of a vertical length of the pole. One or more T-slots 14 or other bracket mounting elements, including for example pegboard holes or shelf bracket slots, extend along at least part of the vertical length of each side wall. A mating element 15 on the root portion 11 of each bracket mounts the bracket to a selectable bracket mounting element of the pole at a selectable height. For example, the mating element may comprise a nut slidably retained within the T-slot and a bolt inserted through the root portion of the bracket and threaded into the nut to secure the bracket at the selectable height on the pole. Alternately, other mating elements may be used. For example pegboard hooks or shelf bracket hooks may be used with respective bracket mounting elements.

The arms 12, 13 of the bracket may form a V shape in the top view. Benefits of this shape include: a) the arms do not substantially overlap the growing medium 16; and b) growing containers of different diameters can be suspended by the arms, and each container is held at approximately the same distance from the pole by sliding inward along the V to a point at which the separation of the arms equals the container diameter. Smaller-diameter containers can be attached to the arms by looping one suspension loop 9 over one arm end 12E, then sliding that loop 9 to the middle of the arm 12, then looping the second suspension loop 10 over the second arm end 13E while flexing the loops 9, 10 apart.

The two arms 12, 13 may be formed from a single rod bend into a V shape as shown. A plate 17 of the bracket may comprise a top surface and the root portion 11 that contacts the pole. An apex portion 16 of the bent rod may be attached to the plate 17. The apex portion 16 of the rod may have a truncated shape as shown. The plate 17 may have left and right sides 18, 19 that form a V-shape in a top view, with a truncated apex of the V-shape forming the root portion 11 of the bracket, which may fill most of a width of a side wall S1-S8 of the pole.

To maximize the number of containers on the pole at a given height, the divergence angle of the arms 12, 13 and the sides 18, 19 of the bracket plate may be limited to prevent interference between adjacent brackets at the same height. For a pole with N equally spaced T-slots, the divergence angles A1 and A2 may be limited to 360/N plus or minus 5 degrees. The pole cross-section may be shaped as a regular polygon with N sides, having one T-slot or other bracket mounting element on each side as shown. With an octagonal pole as shown, divergence angles A1 and A2 may be limited for example to 45 degrees plus or minus 5 degrees, leaving just enough room for adjacent suspension loops 9, 10 of adjacent containers. Brackets for larger containers may diverge at up to 60 degrees plus or minus 5 degrees. With an octagonal pole as shown, a 60 degree divergence angle of the arms allows mounting four large sized brackets at the same height by using alternate T-slots 90 degrees apart.

Figure 3:
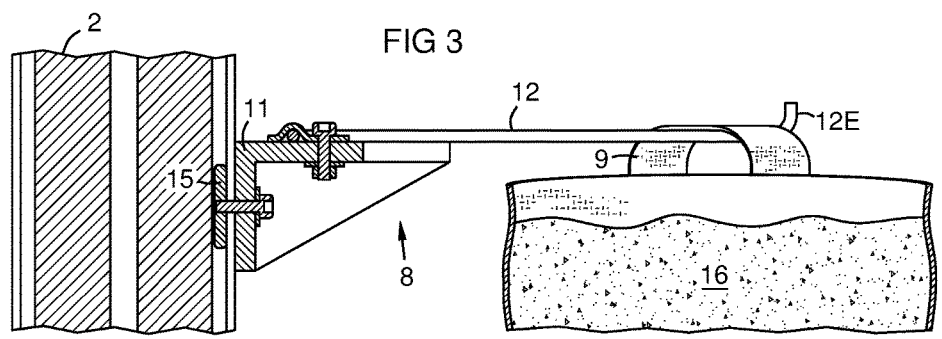
FIG. 3 is a side sectional view of a vertical pole taken on line 3-3 of FIG. 2.

FIG. 3 is a side sectional view of a vertical pole taken on line 3-3 of FIG. 2, showing a bracket 8 holding a suspension loop 9 of a plant growing container 3. The bracket has a root portion 11 affixed to a side of the pole, and a first arm 12 extending to a distal end 12E, which may include a retention element such as a hook as shown for retaining the suspension loop 9.

Figure 4:
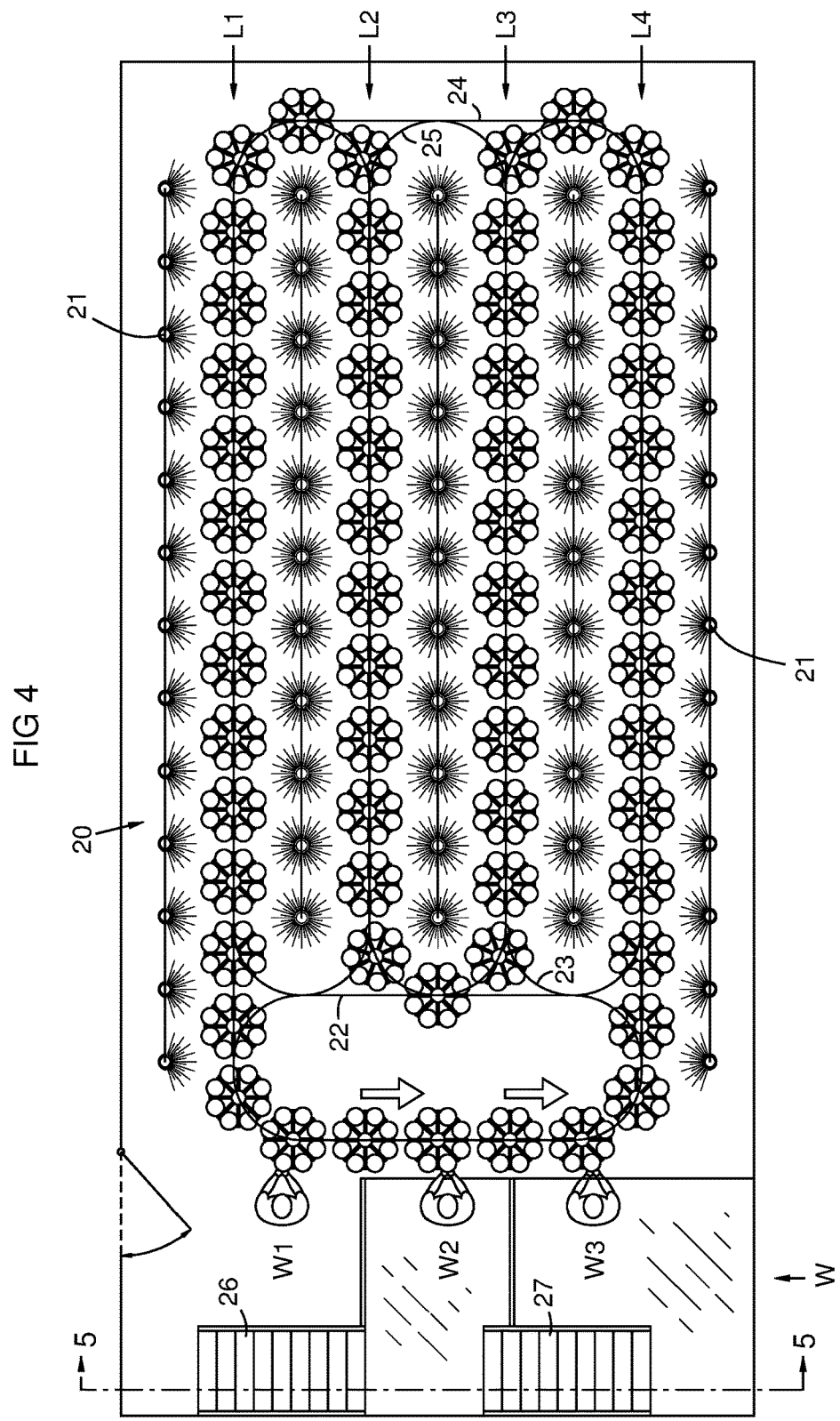
FIG. 4 is a top schematic monorail layout with a work area and multiple lines of suspended plant growing poles in an enclosed growing area.

FIG. 4 depicts a monorail layout with multiple rail lines L1, L2, L3, L4 in an enclosed growing area 20. Grow lights 21 may be mounted on stationary poles beside and between the lines of grow poles. Manual or computer controlled switching mechanisms may provide alternate rail routes exemplified by rail segments 22, 23, 24 and 25. These may be used to manually or automatically bring the poles individually or in groups to a workstation W for maintenance (e.g. planting, inspection, trimming, fertilizing, watering, pest removal, and/or harvesting), while allowing other poles dwell in the growing area longer. The control system can manage each pole movement and dwell time to provide a sequence of poles to the workstation ready to harvest just-in-time based on parameters of local demand.

Depending on the height of the poles, the workstation W may have multiple levels W1, W2, W3. In FIG. 4 the poles may be about 16 feet tall for example. The workstation has three levels—a first lowest level W1, a second level W2, and a third level W3. The second and third levels are reached by respective stairs 26, 27. Alternately, workers may work on vertically movable platforms or bucket lifts operated by hydraulics or another lift mechanism. Herein the term "worker" includes both human and robotic workers.

Not depicted in the diagrams is the method by which the monorail or I-beam system is held in place. This may be accomplished by either a stand-alone, floor mounted superstructure or roof support trusses (or beams) to which the monorails may be attached. Attachment to the superstructure or roof support trusses (or beams) can be by welding, bolting, gluing, riveting or other attachment means. NikoTrack LLC and PacLine Corporation are examples of providers of overhead rail conveyor systems capable of switching the routes of trolleys among alternate rails.

Figure 5:
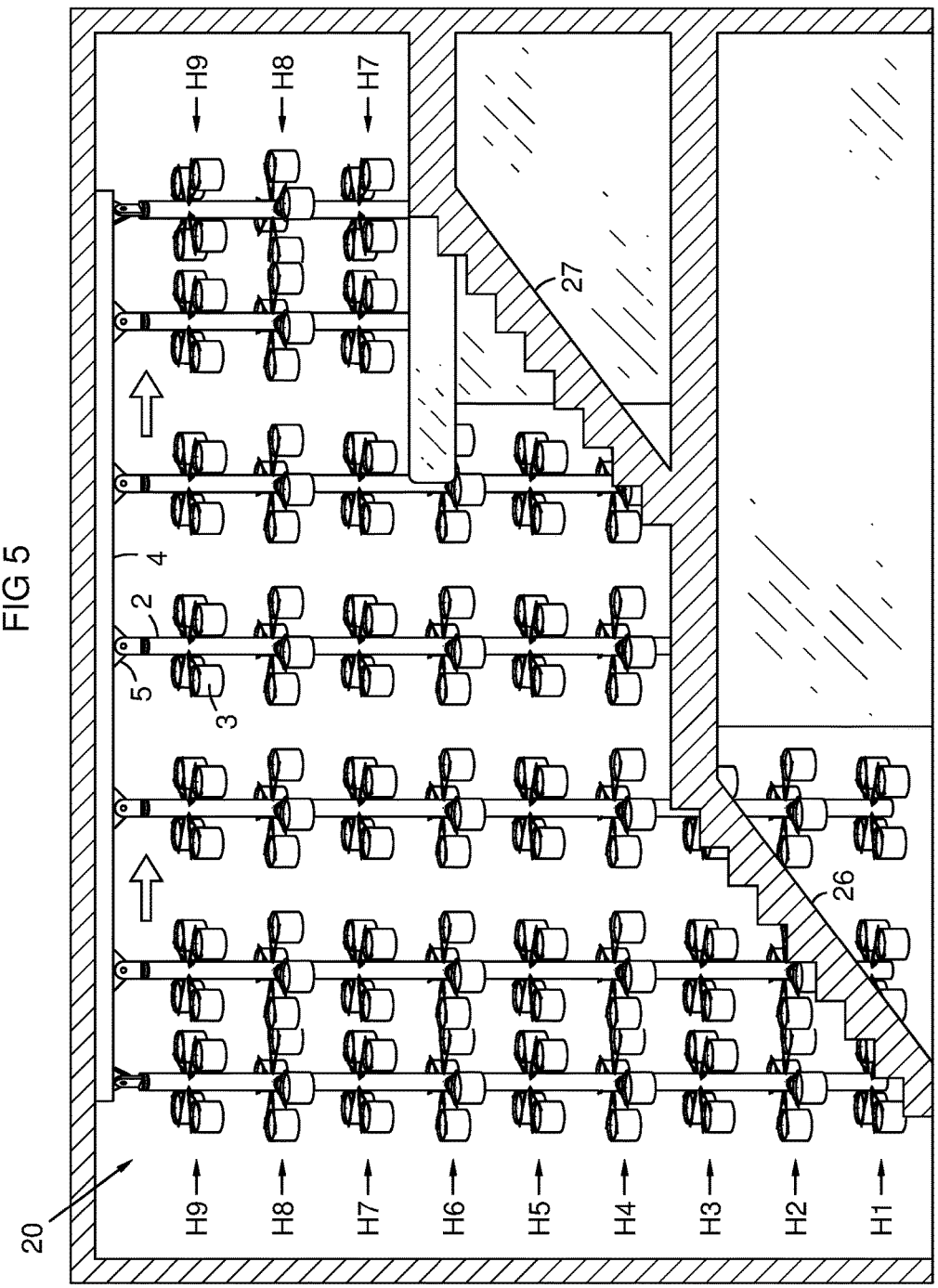
FIG. 5 is a front sectional view taken on line 5-5 of FIG. 4, illustrating a workstation with three levels.

FIG. 5 is a front sectional view taken on line 5-5 of FIG. 4, illustrating a workstation with three levels—a first lowest level W1, a second level W2, and a third level W3. The second and third levels are reached by respective stairs 26, 27. Alternately, workers may work on vertically movable platforms or bucket lifts operated by hydraulics or another lift mechanism. In this example, the plant growing poles are 16 feet tall, with nine plant container mounting heights H1-H9. Workers manage heights H1-H3 on the first level, heights H4-H6 on the second level W2, and heights H7-H9 on the third level W3. Such tall poles increase farm density per footprint without multiplying the rail layout.

FIG. 6 is a side schematic view of a facility with two vertically stacked grow areas 20A, 20B served by a workstation WA that can serve both grow areas 20A, 20B by managing respective poles 2A, 2B on respective front and back sides of the workstation. Optionally, a second workstation WB may be provided specifically for the upper poles. If the poles are tall, the workstation(s) may be multi-level. An inclined rail 42 transfers poles from the lower level to the upper level. The same inclined rail in reverse direction, or another inclined rail on the opposite side of the facility (not visible in this view), transfers poles from the upper level to the lower level. The sets of poles in the two grow areas 20A, 20B may be independent of each other, and may be operated with independent schedules and different growing conditions.

A facility incorporating the present invention may have growing conditions that vary with height, such as a natural temperature/humidity gradient caused by convection, or a gradient in radiant energy caused by distance from an artificial radiant energy source (grow light) or from natural sunlight entering through a ceiling. Such variations may be controlled, such as with fans or auxiliary radiation sources or by rotating plants periodically to different locations in order to achieve a consistent average condition over time for each plant. Alternatively, different growing conditions may be provided by different lighting, airflow, and irrigation at different vertical portions of the poles, and/or different vertically stacked grow areas, and/or different horizontal subsets of the poles. The growing conditions may be varied to accommodate different species of plants, or to produce different portions of a crop ready for harvest on different days on the same pole or on different subsets of the poles. For example the lighting, irrigation, or temperature of each respective growing condition may be varied enough at different vertical or horizontal locations in a grow area or in different vertically stacked grow areas to vary the harvest date on different poles by at least one day.

FIG. 7 is a side schematic view of a facility with two vertically stacked grow areas 20A, 20B allowing exchange of poles between the two areas. Poles in the lower grow area 20A can be routed to the upper grow area 20B by switching them onto an upward inclined rail 42. Poles in the upper grow area 20B can be routed to the lower grow area 20A by switching them onto a downward inclined rail 43. A single workstation WA can serve both grow areas. Optionally, a second work area WB can be provided at the upper grow area. The inclined rails are shown on the same side of the facility for clarity. Alternately or additionally, they may be on different sides of the facility.

The present invention increases farming efficiency. It may be aided by computer programs controlling the growing cycles thereby permitting weekly or daily harvesting of crops and delivery to meet demand rather than bulk harvests of entire fields and the inefficiencies and environmental impact of spoilage and transportation pollution caused by traditional farming and harvest methods and storage requirements. It may be relatively or totally isolated from the outdoor environment, such as an indoor space defined by a building, tent, air-dome, or other such structure. A farm in accordance with an embodiment of the present invention may be located within a city, such as in close proximity to restaurants, convention center, entertainment center, theme park or other facility creating a large demand for fresh agricultural products. The walls/roof of the structure may be completely or partially or controllably opaque, allowing entry of a predetermined amount of sunlight, with supplemental radiant energy being provided artificially. Exchange of air between the indoor space and the outside may be excluded, limited or selectively controlled. This not only facilitates the control of temperature and humidity, but it also hinders the ingress of pests and pollutants, thereby facilitating organic growing practices. Organic growing techniques may be further promoted by introducing only sterilized soil and/or other materials into the indoor farm. The indoor airspace may be temperature/humidity controlled, filtered, and/or pressurized so that any leakage through the structure is only in the outward direction in order to eliminate/minimize the ingress of pests and pollution. Moreover, the gas composition of the indoor space may be controlled, such as by augmenting the content of carbon dioxide or otherwise adding/removing gas species or vapors which favor the growth of a particular plant type.

Advantageously, the controlled growing conditions allow not only a programmed crop harvest timed to coincide with a pre-planned crop demand, but also allow a leveling of labor demand over time. Traditional farming techniques require peak labor periods, such as at planting and harvesting time, necessitating the employment of temporary laborers. Environmental conditions can affect planting and harvesting schedules, thereby introducing additional uncertainty into labor pool management. Temporary labor may not be available when it is needed, and temporary employees tend to have little loyalty to the employer. In contrast, the present invention allows crop scheduling which corresponds to client demand, which tends to be relatively level over time, thereby leveling the labor demand over time. Moreover, the present invention enables the use of full-time employees to satisfy most labor requirements, thereby ensuring the availability of the labor source and building loyalty of the employees toward the employer. Because crop planting/harvesting is planned and scheduled independent of weather conditions, and preferably in response to pre-existing client purchases, periods of peak labor demand which may require the use of some temporary employees are identified well in advance of the need and with a high degree of timing certainty.

The present invention may include a population of insect pollinators, such as bees, being maintained within the farm enclosure, thereby ensuring the availability of the insects for pollination while protecting the insects from outside environmental hazards.

While the price per square foot of a building located in a city may be far in excess of the price of a field in the country, the economics of the present invention can be favorable due to a number of economic factors. The utilization of vertical space greatly increases the number of plants that can be grown per unit area. There will be lower crop loss caused by insects and other animals. Crop damage due to drought, excess rain, wind, hail, etc. is eliminated. Transportation costs are minimized because the crops are grown close to the customer's location. Crop damage during harvesting is minimized because it is conducted in a controlled factory environment, and crop spoilage and damage during transportation is virtually eliminated. A higher crop yield per plant can be achieved due to the controlled organic growing conditions. Moreover, crops may be grown closely together in the growing section of the farm because there is no need for equipment or people to access the plants in the growing section. All human or machine interaction with a plant can be accomplished in the maintenance section of the farm, thereby allowing a very compact, densely packed growing area. Importantly, purchasers of the crops may be expected to pay a premium for a guaranteed crop supply on a pre-planned schedule, harvested at a planned peak flavor stage, and delivered as fresh as perhaps on the day that they are harvested. While sunlight is free and the present invention anticipates some use of electricity to produce radiant energy, the roof of the farm structure may be utilized for solar and/or wind power harvesting, thereby mitigating the cost of electricity. And while rain is free and the present invention anticipates some use of city or well water, that cost can be mitigated by using only an optimal amount of water and the collection and re-use of any run off. Furthermore, the lack of pests within the farm enclosure should minimize or completely eliminate the cost of pesticides, and there is no need for field equipment such as tractors or trucks to support maintenance activities.

Other means of conveyance may be used to move plants within the farm enclosure, such as carts which move on rails or pathways, moving beltways, small barges floating in an indoor aqueduct system, robots which selectively grasp and convey individual plant containers upon demand; etc.

While various embodiments of the present invention have been shown and described herein, such embodiments are provided by way of example only. Variations and substitutions may be made by those skilled in the art without departing from the invention herein. Accordingly, the invention is to be limited only by the scope and intended meaning of the appended claims.

The invention claimed is:

1. Agricultural apparatus comprising:
   multiple vertical poles, each respective vertical pole supporting plant growing containers at multiple heights on the pole; and
   an irrigation reservoir mounted on each respective vertical pole;
   wherein the reservoir provides gravity-feed irrigation to the multiple heights on the pole via an irrigation line or lines comprising outlets with differential metering per height that compensates for different water pressures at different heights on the pole;
   each vertical pole suspended from a movable conveyance of a conveyor system that moves the pole between a growing area and a workstation.

2. The agricultural apparatus of claim 1, wherein the workstation comprises multiple vertical levels, each level providing access for a worker to a different vertical portion of a pole at the workstation.

3. The agricultural apparatus of claim 1, wherein the conveyor system moves at least some of the vertical poles between a lower growing area, an upper growing area disposed above the lower growing area, and the workstation.

4. The agricultural apparatus of claim 3, wherein:
   the workstation is disposed on a same vertical level as the lower growing area;
   the conveyor system comprises a layout of overhead rails that retain the conveyance of each of the poles and provides multiple switch-selectable rail routes, including rail routes that interconnect the lower and upper growing areas; and further comprising:
   an electronic control system that directs a switching of the rail routes and the moving of said at least some of the vertical poles between the upper and lower growing areas.

5. A method of farming utilizing the apparatus of claim 3, comprising:
   providing respectively different growing conditions in the lower and upper growing areas; and
   moving one or more of the vertical poles via the conveyor system to the lower or upper growing area depending on a desired growing condition for said one or more of the vertical poles.

6. The agricultural apparatus of claim 1, further comprising:
   at least one sensor that communicates a liquid level in each reservoir to an electronic control system of the agricultural apparatus; and
   an irrigation refill outlet at a location on the conveyor system or on a support structure thereof;
   wherein the control system senses depletion of each reservoir via the respective liquid level, moves the respective pole on which the reservoir is mounted to the refill outlet via the movable conveyance, and functions to refill the reservoir as needed.

7. The agricultural apparatus of claim 1, further comprising:
   an irrigation distributor on each respective pole below the irrigation reservoir, the distributor comprising multiple outlets that irrigate a subset of the plant growing containers on the pole at or below a height of the distributor;

wherein the irrigation distributor is supplied by the irrigation line or one of the irrigation lines from the irrigation reservoir; and wherein the distributor provides metered irrigation to the multiple outlets thereof.

8. The agricultural apparatus of claim 7, further comprising an electronic control system that controls the irrigation distributor to meter the irrigation based on input from a sensor that measures a soil moisture in the subset of the plant growing containers.

9. The agricultural apparatus of claim 1, further comprising:

multiple irrigation distributors on each respective pole below the irrigation reservoir, each distributor comprising multiple outlets that irrigate a subset of the plant growing containers on the pole at one of the multiple heights on the pole;

wherein each irrigation distributor is supplied by one of the irrigation lines from the irrigation reservoir; and wherein each distributor provides metered irrigation to the multiple outlets thereof.

10. Agricultural apparatus comprising:

multiple vertical poles, each respective vertical pole supporting plant growing containers at multiple heights on the pole;

wherein each pole is suspended from a trolley of a conveyor system that moves the poles between a growing area and a workstation;

wherein the workstation comprises multiple vertical levels, each level providing access for a worker to a different vertical portion of a pole in the workstation.

11. The agricultural apparatus of claim 10, further comprising:

an irrigation reservoir mounted on each vertical pole;

wherein the reservoir provides time-release gravity-feed irrigation to the multiple heights on the pole via an irrigation line or lines comprising outlets with differential metering per height on the pole that compensates for different water pressures at different heights on the pole;

a respective sensor in each reservoir that communicates a liquid level to an electronic controller of the agricultural apparatus; and an irrigation refill outlet at a location on the conveyor system or on a support structure thereof;

wherein the electronic controller senses depletion of each reservoir via the respective sensor, moves the pole on which the reservoir is mounted to the refill outlet via the trolley, and opens a valve to refill the reservoir as needed.

12. The agricultural apparatus of claim 11, further comprising:

an irrigation distributor on each respective pole below the irrigation reservoir, the distributor comprising multiple outlets that irrigate a subset of the plant growing containers on the pole at or below a height of the distributor;

wherein the irrigation distributor is supplied by one of the irrigation lines from the irrigation reservoir; and wherein the distributor provides metered irrigation to the multiple outlets thereof.

13. The agricultural apparatus of claim 12, wherein the electronic controller controls the irrigation distributor to meter the irrigation based on input from a sensor that measures a moisture in the subset of the plant growing containers on the pole.

14. The agricultural apparatus of claim 11, further comprising:

multiple irrigation distributors on each respective pole below the irrigation reservoir, each distributor comprising multiple outlets that irrigate a subset of the plant growing containers on the pole at one of the multiple heights on the pole;

wherein each irrigation distributor is supplied by one of the irrigation lines from the irrigation reservoir; and wherein each irrigation distributor provides metered irrigation to the multiple outlets thereof.

* * * * *